Feb. 7, 1939. A. D. LANEVILLE 2,146,080
VISOR FOR AUTOMOBILE DRIVERS
Filed Sept. 17, 1937
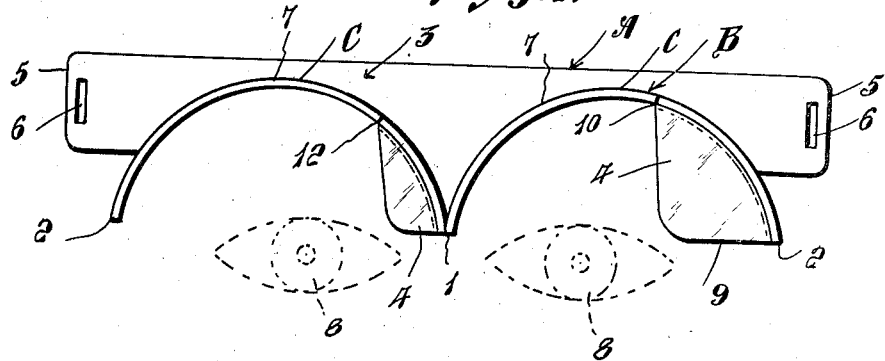
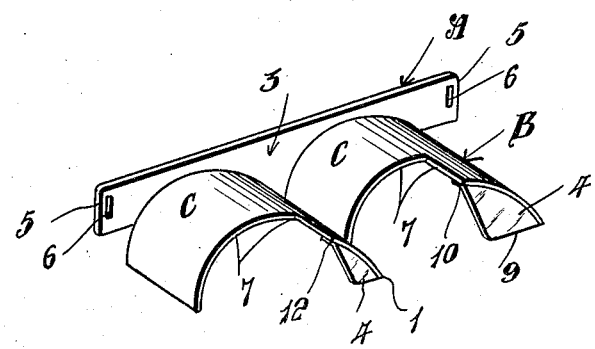
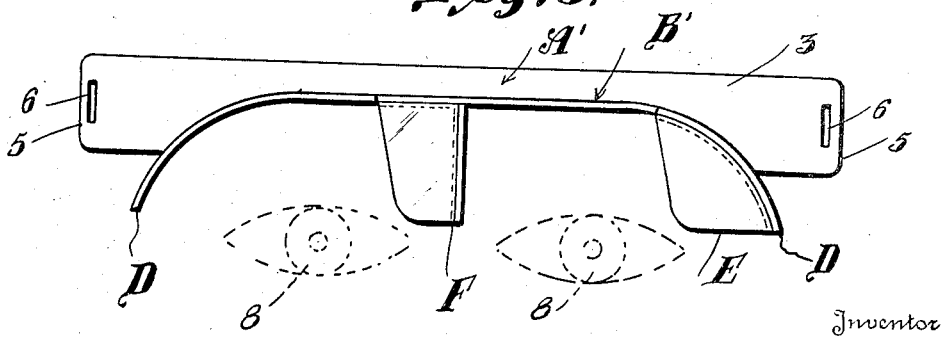
Inventor
Albert D. Laneville
By L. F. Randreph
Attorney Patented Feb. 7, 1939

2,146,080

UNITED STATES PATENT OFFICE 2,146,080

VISOR FOR AUTOMOBILE DRIVERS

Albert D. Laneville, Manchester, N. H.

Application September 17, 1937, Serial No. 164,356

7 Claims. (Cl. 2—12)

This invention relates to an eyeshield or visor for vehicle drivers.

A primary object of this invention is to provide a device which may be worn by vehicle drivers to shield the glare of headlights of approaching vehicles at night, but which may be also used to shield the driver's eyes from sun glare.

More particularly it is an object of this invention to provide a device employing pieces of translucent material disposed in spaced relationship to each other and at a substantial distance in front of the eyes and to one side thereof, so that the strips will not normally interfere with the wearer's line of vision.

The advantage of this device resides in the fact that the translucent material performs the same function as colored glasses in filtering light rays from approaching vehicles, while being so arranged that they will not interfere with the driver's normal vision when there are no light rays to contend with.

Other objects and advantages of the invention will hereinafter become more fully apparent from the following description of the drawing which illustrates a preferred form of the invention, and wherein:

Figure 1 is a front elevational view of the visor,
Figure 2 is a perspective view of the same, and
Figure 3 is a view similar to Figure 1 showing a slightly modified form of the visor.

Referring more particularly to the drawing wherein like reference characters designate like or corresponding parts throughout the different views, the visor designated generally A comprises a strip 3, forming a band adapted to be positioned across the forehead of a vehicle driver, and a hood B preferably formed integral therewith and projecting outwardly therefrom substantially at right angles thereto.

Band 3 is provided at its opposite ends 5 with slits or openings 6 adapted to be connected to opposite ends of an elastic strap or the like, not shown, which extends around the head of the wearer to support the visor A in position on the forehead.

The hood B as seen in Figures 1 and 2 comprises the portions C—C which are arcuately shaped in cross section. The adjacent depending sides 1 of the portions C—C are disposed between the eyes, indicated at 8 in Figure 1, and slightly above their horizontal axes, while the outer depending sides of hood B are disposed on the outer sides of the eyes 8 with their lower edges in substantially the same horizontal plane as the ends 1.

Looking outwardly from hood B or from behind band 3, portions C—C at their outer left ends are provided with shields 4 preferably formed of a colored translucent material. One of the shields 4 projects inwardly from the edge 2 to a point short of the driver's normal line of vision, then upwardly to the point 10. The other member 4 projects in the same direction from edge 1 to a point substantially the same distance from the normal line of vision of the other eye 8 then upwardly to the point 12. As seen in Figure 1 the member 4 secured to the edge 2 is substantially larger than the other member 4 because edge 2 is further from the eyes 8 than the edge 1, so that the two pieces 4 are substantially the same distance from the normal line of vision of the two eyes 8.

The portions C—C are cutaway as indicated at 7 for a purpose which will hereinafter be described.

In Figure 3 a slightly modified form of the visor is shown wherein the hood B' has the opposite depending ends D from one of which extends the shield E corresponding to the shield 4 which extends inwardly from the edge 2. The other shield F depends from the intermediate portion of the hood B', and a center wall, not shown, may be suitably secured to the underside of the hood to depend downwardly therefrom to be secured to one side of the shield F to reinforce it if desired. Said wall being secured to the perpendicular side of the shield F. Hood B' is preferably formed integral with the band 3, which is bent at right angles to the hood to position the latter at right angles to the forehead of the wearer when the band is in position.

Visors A and A' may be formed of any desired material, but it has been found in practice that they can be economically and efficiently produced from a blank or semi-rigid fabric such as cardboard or the like, which may be cut and bent to form the hood B or B' and the band 3.

From the foregoing it will be seen, that when the visor A or A' is positioned on the head of the wearer as heretofore described, so that the hood B or B' extends outwardly from a point above the eyes, the translucent shields 4 or E and F will be disposed at a point in front of the eyes and on the left of each. Under normal conditions the driver will look straight ahead so that the translucent shields will not effect his vision, but on the approach of another vehicle at night having bright lights, the rays of which interfere with his vision, he may readily tilt his head downwardly and away from the rays of said lights so that the two pieces of translucent material intersect an imaginary line from the two eyes 8 to the headlights so that the rays therefrom will be filtered through and dimmed by strips 4 or E and F. Cut-out portions 7 permit the driver to view the right hand side of the road when his head is tilted to shut-out the rays from approaching vehicles.

Various other modifications and changes in the invention as illustrated and described may obviously be made and are contemplated, and the right is therefore expressly reserved to make such variations and changes as do not depart from the spirit and scope of the invention as hereinafter defined by the appended claims.

I claim as my invention:

1. A device of the class described comprising a strip of material adapted to be positioned across the forehead and having openings at each end thereof, a hood projecting outwardly from said strip and having downturned ends and a depending center portion, and pieces of translucent material secured to one of said downturned ends and to the depending center portion and projecting therefrom in the same direction, said translucent material being adapted to shield the eyes from the rays of approaching vehicle lights when the head is tilted.

2. In a visor for vehicle drivers, a band adapted to engage the forehead of a driver and adapted to be held in position thereon by an elastic strap secured to its opposite ends and extending around the head, a hood projecting outwardly from said band above the eyes and having its opposite ends turned downwardly, a portion depending downwardly intermediate the ends of said hood, and pieces of colored translucent material secured to said intermediate depending portion and to one of said depending ends, disposed at right angles thereto and extending therefrom in the same direction.

3. An anti-glare device for motor vehicle operators, comprising a forehead band, a hood projecting outwardly from said band, and strips of colored translucent material depending from said hood in spaced apart relationship, said translucent material being positioned to bisect a line between the wearer's eyes and the headlights of an approaching vehicle when the head is tilted downwardly and away from said vehicle.

4. In an anti-glare visor for vehicle operators, a hood adapted to project outwardly from the forehead of a vehicle operator, said hood being provided with downwardly extending sides and a depending center portion, and pieces of colored translucent material secured to one of said sides and to the center portion at their outer ends, at right angles thereto and projecting therefrom in corresponding directions, said translucent material adapted to shield the operator's eyes from the light rays of an approaching vehicle when the head is tilted downwardly and away from the vehicle.

5. A device as in claim 4, said hood being provided with cut-out portions at its outer ends extending in corresponding directions from said translucent material.

6. A device of the class described comprising a brow band, a hood formed integral therewith and projecting outwardly therefrom, and strips of colored translucent material depending from said hood in spaced relationship, one of said strips being disposed adjacent one end of the hood and the other intermediate the ends thereof, said band and hood being formed of a semi-rigid material.

7. In an anti-glare shield, a strip adapted to engage the forehead of the wearer, a visor projecting outwardly therefrom, strips of anti-glare material depending from said visor in spaced relationship to each other, and a partition depending from said visor intermediate of its ends and disposed between said anti-glare strips.

ALBERT D. LANEVILLE.